Feb. 14, 1950 J. O'D. SHEPHERD 2,497,142

SOUND RECORDER AND REPRODUCER

Filed Dec. 18, 1941

INVENTOR

Judson O'D. Shepherd

Patented Feb. 14, 1950 2,497,142

UNITED STATES PATENT OFFICE 2,497,142

SOUND RECORDER AND REPRODUCER

Judson O'D. Shepherd, Atlanta, Ga.

Application December 18, 1941, Serial No. 423,450

22 Claims. (Cl. 179—100.4)

This invention relates to the method and means of recording oscillations, particularly sound vibrations, on an extensive medium and subsequently reproducing from such a record corresponding oscillations.

The use of an extensive medium generally has required that processing be employed subsequent to the recording operation in order to prepare the record for reproduction, of which the familiar photographic processes employing film is an example. Use of a magnetic tape for this purpose traverses the need for processing but it has other limitations including cost, size and weight of the record per unit of recording time which has generally restricted its use to brief records on an endless tape for repeated playback. Employment of a tape of deformable material containing a groove to be undulated for a record requires that the tape have a substantially rectangular section to facilitate the proper presentation of the groove to the stylus for recording and playback. Rectangular tapes are difficult to store in restricted space since they must generally be wound in a single plane. The use of a round thread or filament upon which record is formed by cutting or distortion in response to the received vibrations heretofore has not proved practical due to the difficulty of presenting continuously to the reproducing means the sector of the thread or filament upon which the undulations have been formed.

The instant invention is an improvement over the art in that it enables the record to be made on a small tape or filament in such a manner that the record is immediately available to be played back. An example of the many applications of this device is in the field of dictation machines which now exclusively in commerce employ records of wax or the like, which are costly and reusable only after shaving. With the means described herein, the filament employed is of such size and cost as economically to permit it to be discarded after the record on it has been transcribed. Since it is immediately available for playback, the device may be operated with as much facility as, or greater than, with present machines of this general class.

The filament, tape, ribbon or the like, referred to generally herein as the filament, which may be employed in this invention is made of a light transmitting, flexible material which can be deformed or cut. This filament is passed at a uniform rate under a deforming or cutting blade which is driven in response to sound waves or electrical currents from a suitable source and within an appropriate frequency range. This blade deforms or cuts the filament, leaving thereon undulations corresponding to the sound or other vibrations. During playback this filament is passed through a narrow beam of light which is directed into a photocell of suitable type. This beam is modulated in accordance with the undulations of the record as the latter moves through it to result in the photo-cell controlling an electrical circuit to cause an undulating current therein corresponding to the record. The latter current can be amplified and used to actuate a telephone receiver or a loud speaker, or otherwise employed.

Several means are described herein for effecting playback from such a record. In one embodiment, the beam of light is narrow and polarized in a predetermined direction. The photocell has a polarizing medium in front of it so oriented with respect to the polarization of the projected beam as substantially to extinguish it. As is well known, an optically active transparent substance placed above this medium will result in the rotation of the light waves to where the medium in its previously mentioned orientation will not extinguish it. The filament proposed may be made of an appropriately grained optically active substance, of which cellophane is an example, and will be passed through the beam above the medium to result in their being transmitted to the photo-cell a spot of light which, in an unmodulated filament, will be substantially as wide as the thickness of the beam say 1 mil, and as long as the filament is wide, if a flat filament is employed. Where a filament of round cross-section is used, there will be a refractive effect and the rays of the scanning beam may be accumulated and directed into the photocell. If a relatively flat filament is employed with the record on the edge thereof, and a flat side is presented to the light beam, the beam will be modulated by the passage of the hills and valleys of the record through the beam. It will be recognized that this overcomes a serious problem confronting one in attempting to reproduce from modulations on an opaque tape, in that there will be presented to the photo-cell with such an arrangement a bright background with the silhouette of the tape thereon to result in comparatively small percentage modulation in comparison with the arrangements described herein whereby the background is dark and the record is bright to result in modulation of the beam which may be in the general order of 50%.

Another feature of this invention is means to employ a round filament which is desirable for reasons of handling since the use of a flat one requires a particular orientation be preserved. The latter, in turn, necessitates a larger filament than if a round one is employed so that greater storage capacity is required for a given recording interval and the filament will be more expensive than if a round one is used. The reproduction arrangements to be described will effectively reproduce the record irrespective of the orientation of the filament as presented to the reproducer.

A further feature of this invention is that it will permit a much longer recording period on a single filament than is feasible with a disc or a cylinder record. This is particularly advantageous in the recording of a court or the like proceeding, or the recording of radio programs or other applications where continuous recording over a long period of time is necessary, inasmuch as a single large spool or the like of filament can be provided which will serve for many hours. This also is true of dictation machines in that a large roll of filament may be provided and the recorded portion removed from time to time as desired for transcription.

Still a further feature is a recorder which may be employed on vehicles or the like, such as aeroplanes. Relatively violent movement of the vehicle will not affect the recording operation. The use of disc or cylinder record type machines is difficult under such conditions.

These and other features of this invention will be understood from the drawing and description thereof which follow.

Figures 1, 2, 3, 4, 5, 6:
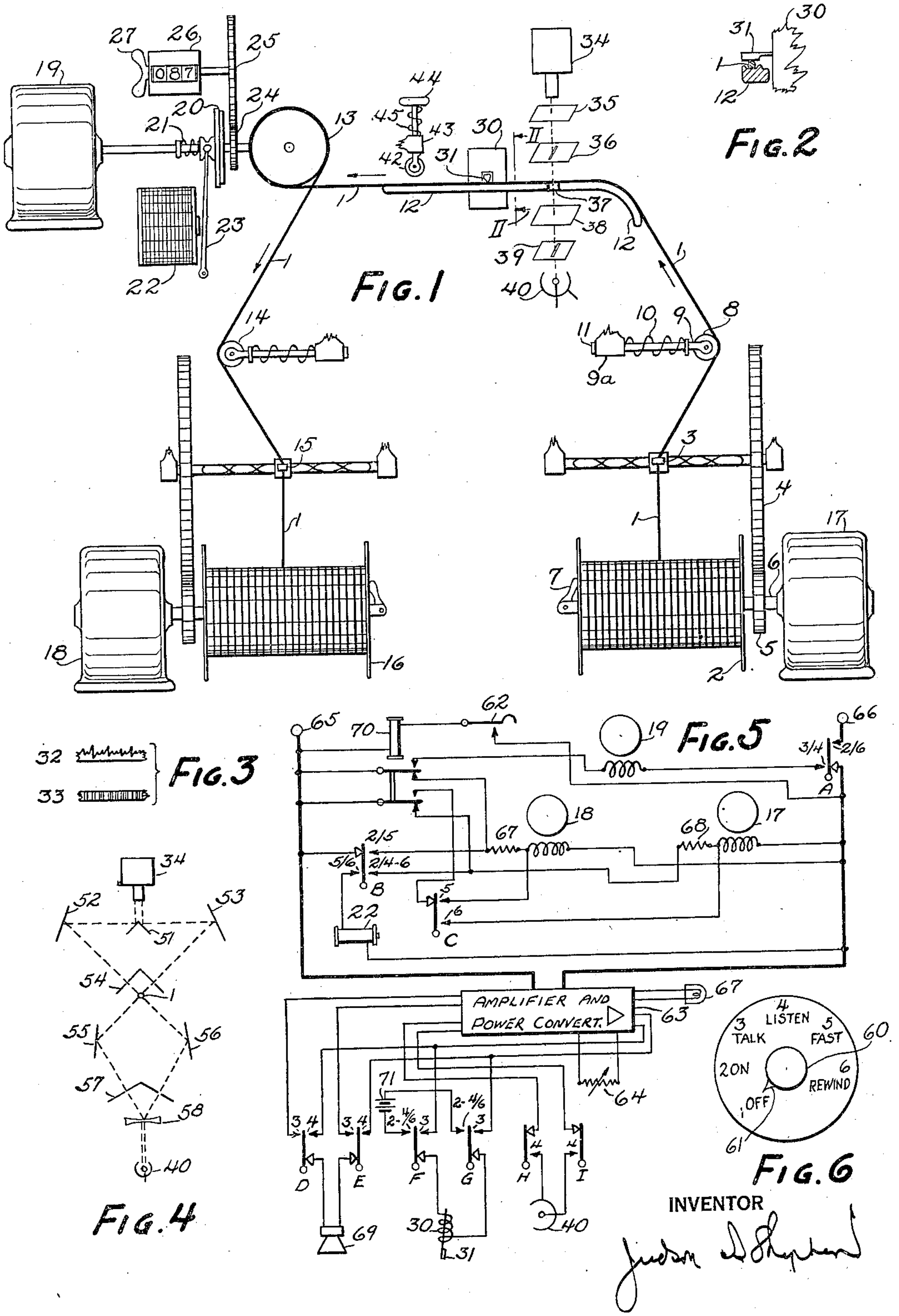
Figure 1 shows a diagrammatical relation of certain of the elements, with the framework and many of the parts which may be of conventional type omitted for clarity, of a combined recorder and reproducer.
Figure 2 is a partial section along the line II—II of Figure 1 showing the relation of the recording element and the filament.
Figure 3 shows sections of a record on a round filament in two different orientations, 90° apart.
Figure 4 is an alternative arrangement for translating the record into a modulated light beam.
Figure 5 is a circuit which may be used in practicing this invention.
Figure 6 shows a manually operable knob and index for controlling the operation of the invention.

With reference to Figure 1, a filament 1, which for the purpose of describing the preferred embodiment of this invention will be assumed and is shown to be substantially round, is supplied from a bobbin or spool 2. This filament passes through an eyelet 3 attached to the distributing member of a conventional level winder, which is driven by gear 4 meshed with gear 5 attached to shaft 6 upon which spool 2 is removably attached. Clip 7 locks the spool in position. It is to be understood that full spools of filament may be inserted on shaft or spindle 6 when necessary to supply the device.

Filament 1 passes around roller 8 rotatably mounted on rectangular shaft 9 slidably mounted in fixed bracket 9*a*. A spring 10 tends to maintain the roller to the right, being limited by collar 11. It is the purpose of this arrangement to provide a yieldable element as a protection to the filament against shock arising from starting. The filament then passes over the plate 12. After traversing the length of the plate it is wound around driving roll 13 which has a suitable surface to drive the filament by friction. The filament then passes over roller 14 similar to roller 8, and provided for the same general purpose, through the eyelet 15 of a level winder to the takeup spool or bobbin 16, which may be similar to spool 2.

Shaft 6 and spool 2 may be driven by motor 17 and spool 16 with its associated shaft and gearing may be driven by motor 18. It is the purpose of these two motors to effect takeup, to maintain the filament in tension and to drive the spools at comparatively high speed during rewinding or locating a particular portion of the record. Roll 13 is driven through clutch 20 by motor 19. It is to be understood that any suitable type of motors 17, 18 and 19 may be used to meet the general operating requirements as set out below, and speed reducing gearing may be employed between said motors and their respective driven elements. Motor 19 preferably should be of constant speed, so it may be of the synchronous type or equipped with conventional governing means, not shown.

The plates of clutch 20 are normally maintained engaged by spring 21. A clutch magnet 22, upon being energized, attracts its armature 23 and an extension thereof separates the plates of the clutch to operatively disconnect motor 19 from roll 13.

A pinion 24, attached to the drive shaft of the roller 13, is meshed with gear 25 which drives a conventional counter 26, said counter being provided with resetting means indicated as a wing member 27. The gearing and counter are provided to indicate measurement of the record. It is suitably calibrated in inches, centimeters, minutes or other appropriate units.

The recording device 30 basically may be similar to a familiar recording element used in the electrical recording of disc phonograph and the like records. Such an element includes a driving coil energized in response to sound or the like currents to drive a needle or stylus. In application to the instant purposes a suitable designed deforming blade 31 is employed instead of a needle or stylus. The device 30 is mounted so that the blade 31 will be driven transverse to the direction of movement of the filament. This is better shown by Figure 2 which is a partial section along the line II—II of Figure 1. The filament moves in a shallow groove in plate 12 which may be as deep as approximately one-half the diameter of the filament. During recording the blade 31 will be driven in the vertical plane in response to voice or similar currents to result in the filament being deformed or cut in accordance therewith to leave a corresponding record on the filament. The blade 31 may be wider than the groove as protection against the complete severance of the filament due to a sudden sound or other strong impulse received by the recording device.

It is contemplated that the blade 31 may be biased electrically or mechanically as by a spring or rubber mounting so that it will evenly distort or cut the filament in the absence of incoming signals. The presence of signals will then cause the vibration of the blade above and below this normal position. This may be provided to improve the quality of the record by preventing during recording the member 31 lifting clear of the filament for normal signal volumes.

The deforming or cutting arrangement as shown particularly by Figure 2 may be modified by providing a fixed blade similar to moving blade 31 underneath the filament and in opposition to blade 31 to result in undulations being cut on both the top and bottom of the filament as seen in this figure. It also is apparent that the blade 31 may be driven by a diaphragm actuated in response to sound waves rather than by an electrical arrangement as contemplated in the preferred embodiment of this invention.

Figure 3 indicates a normally round filament with a record thereon, 32 indicating the profile left by the blade 31, while 33 indicates the filament with a record turned through 90° from the presentation of 32.

A roller 42 with predetermined serrations on its periphery may be suitably mounted in bracket 43 and normally maintained out of engagement with the filament by virtue of spring 45. By manually pressing button 44 the roller will engage the filament and deform it in accordance with the serrations on the roller. This deformation will, on playback, result in a particular tone or sound. This may be used to override a portion of the record or to designate to a transcriber the end of a sentence, paragraph or other information. This roller may, of course, be operated magnetically under control of a switch in an energizing circuit.

In order to reproduce from the record, it may be rewound to spool 2 and again driven in the same direction and at the same speed as during the recording operation. A projector 34 projects a beam of substantially parallel rays of light or energy in the portion of the spectrum within or near the visible band, preferably monochromatic light, through a polarizing medium 35, such as "Polaroid," which polarizes the beam in a particular direction. The beam then passes through a slit in screen 36, said slit being in the general order of 1 mil wide, although other widths may be used. This presents a narrow ribbon of light through which the filament passes. A slot 37 is provided in plate 12 for the beam. It then passes through polarizing medium 38 which is so oriented with respect to medium 35 as normally to substantially extinguish the beam. By virtue of the optically active property of the filament, there will be a spot of light about as wide as the slit in screen 36 and approximately as long as the diameter of the filament, giving consideration to the deformation thereof by the record, presented to the photo-cell 40. This contemplates a proper orientation of the polarization of the beam and medium 38 with respect to the filament, in view of the material and internal structure thereof, to produce this effect.

It will be recognized that by adjustment of the polarizing medium 35 and 38 with respect to each other and the filament, a light background may be produced in which the filament without a record will form a shadow. A record on the filament with this arrangement will result in the light which passes through the filament being rotatively modulated to result in a portion of it passing beyond the lower polarizing medium to result in light intensity modulations detectable by the photo-cell. The mediums may, of course, be adjusted in practice to give either a light or dark background, or one in between.

These arrangements will result in the modulation by the record on the filament of the light which reaches the photo-cell. In order to improve the modulation of the beam a second screen 39 with a slit therein parallel to the slit in screen 36 may be provided so that when the filament is presented to the beam as shown by 33, the refraction arising from the undulations may be employed to result in a portion of the beam being intercepted by a side of the slit in screen 39. It is necessary that the latter slit be so adjusted with respect to the beam that the proper phase relationship between the light modulation resulting from presentation of the filament to the beam as shown by 32 and 33, and other angles of orientation thereof, will cause a substantially constant volume level of reproduction. That is, if a constant frequency tone of, say, 1000 cycles is recorded at a particular volume level, a substantially constant volume will be reproduced irrespective of the angle of presentation of the filament to the beam. In order to improve this operation, I may provide a curved prism or lens between the opening 37 and screen 39 so that the refraction effect when the filament is presented as at 33 is amplified, i. e., the angular swing of the beam is increased by virtue of the prism or the like. This may require, of course, that the screen 39 and the photo-cell 40 be located at a proper angle off the center line of the beam as projected by 34.

Another arrangement which may be employed with respect to the reproduction portion of the device is shown by Figure 4. This provides for two beams of light to pass through the filament at approximately 90° with respect to each other as a further means of compensation for various orientations of the filament. The beam of light from projector 34 strikes mirror 51 which divides it into two beams, said beams striking mirrors 52 and 53 which direct them through filament 1 at about 90° with respect to each other. Screen 54 has two slits which reduces the width of each beam to, say, 1 mil. Mirrors 55 and 56 intercept the beams, directing them through slits in screen 57 to condensing lens 58 which projects them to photo-cell 40. This arrangement may, of course, be used with polarizing means above and below the filament as described in connection with Figure 1, and the screen 57 may be omitted. Prisms or lenses may be employed instead of mirrors to provide scanning of the filament through a wide angle and to direct the modulated rays into a photo-cell.

A circuit which may be used with this device is shown by Figure 5. Circuit conventions have been employed to indicate various of the elements. A manually operable control switch is provided to control the various fundamental operations of the device, one form of which is shown by Figure 6. In the latter figure a manually operable rotatable knob 60 is suitably mounted on the cover of the device and is provided to operate contact closing means for effecting appropriate circuit operations. Designations are provided around an arc with this knob as a center and the pointer 61 indicates the operations controlled by the various positions of the switch. Position 1 is for off; position 2 is on; position 3, designated "Talk," is for recording; position 4, designated "Listen," is for reproducing; position 5, designated "Fast," is for driving the filament in the same direction as during recording and reproducing but at a relatively high speed as when a particular position of the record is being found, and position 6 is for rewinding the record. A second manual control is indicated as a switch 62 of Figure 5, which may be on a cord or attached to the mounting of the transmitter-receiver to be described.

The switching mechanism controlled by knob 60 has been shown conventionally as a plurality of cams familiarly known to the telephone art as sequence switch cams, with cooperating brushes. These cams are cut for six operative positions corresponding to the positions of the knob. A designation 5, for example, beside a brush indicates, as is conventional with diagrammatical representation of such cams, that a circuit is completed through the brush and cam in position 5. The designation 2/6 indicates closure for all position from 2 through 6, inclusive. An open triangle indicates a brush closure for all positions. Other contact closing arrangements obviously may be employed.

An amplifier 63 is provided. This may be of conventional type to provide the gain necessary for the operation of the device. It may include a plurality of electronic tubes. It is employed for both the recording and reproducing operations, the gains of which may be different. It is, therefore, to be understood that the transmitter-receiver, the recorder and the photo-cell may be appropriately connected and properly provided with circuit elements in the amplifier for the gains necessary for the desired operation of each under the several operating conditions of the device. The knob 60 may be employed to effect circuit control in the amplifier element for the various operations. The general level of amplifier may be controlled by gain control 64, of which more than one may be provided as desired. Conventional automatic volume control arrangements may also be incorporated in the design of the amplifier.

A suitable source of power is connected to terminals 65 and 66 which, it is assumed herein, will be of the alternating current type of a conventional power frequency. It will be apparent, however, that the device may be modified to be powered from direct current. Cam A controls the power supply to the device. When knob 60 is turned to any of positions 2 through 6 this cam completes an obvious circuit to supply power to the amplifier. Lamp 67 is appropriately connected to a D. C. supply in amplifier 63, or other suitable power supply. This lamp provides the scanning beam and it burning will indicate that the device is substantially ready for operation. Provisions may be made for its observance through a hole in projector 34. It is apparent that a separate lamp can be provided appropriately connected to indicate that the cathodes of the tubes of the amplifier are heated to substantially their operating temperature.

In position 2 a circuit can be traced from terminal 65, the armature and upper back contact of relay 70, resistance 67, winding of motor 18 through the brushes and cam A to terminal 66. A similar circuit can be traced from terminal 65 through the lower back contact of the relay, resistance 68, winding of motor 17 to terminal 66 via cam A. Under this condition sufficient power is supplied motors 17 and 18 to place filament 1 under light tension. The use of resistances in series with these motors to reduce the power thereof is merely a conventional indication of the desired operation and may be modified as appropriate in light of the particular type or types of motors employed in the practice of this invention.

As a preliminary step toward making a record, the knob 60 is turned to position 3. In this position a circuit can be traced from the transmitter-receiver 69 through cams D and E to the input of the amplifier. It is contemplated that the transmitter-receiver will be a device which may be used to convert sound waves into undulating or alternating current, or to take such currents and convert them into sound waves, of which many forms are known to the art. Separate transmitters and receivers obviously may be employed with appropriate minor modification of the circuit arrangements, as will be understood. Where a separate transmitter, microphone or the like is used, a suitable power supply and control therefor may be employed as is conventional with such elements in view of the type thereof. In some applications of the device the input to the amplifier through cams D and E and the conductors therefrom may be connected to a radio set, a telephone circuit or other source of signals to be recorded. The output as represented by the circuits to the right hand brushes of cams D and E may, of course, be extended to a loud speaker, a telephone circuit, a radio transmitter or other suitable device.

In position 3, the recorder 30 is connected to the output of the amplifier through cams F and G. Sound picked up by element 69 will be amplified to result in corresponding energization of the recorder and the actuation of blade 31.

When it is desired to start recording, switch 62 is closed which completes an obvious circuit for the operation of relay 70. Closure of the upper front contact of this relay will complete a circuit to energize self-starting drive motor 19 to drive drum 13 and advance the filament at uniform speed past the recorder. By talking into the transmitter-receiver 69, a record will be made thereof on the filament. The switch 62 may be released to stop the recording as, for example, during a pause in dictating, and it again may be started by reoperation of this switch. Motors 17 and 18 are energized in position 3 by sufficient energy to maintain the filament in tension. Under the condition of recording, motor 18 will revolve to take up the slack in the record as it is paid out from roll 13 and motor 17 will be rotated by the filament in the direction opposite to that in which it is tended to be rotated by its power supply. It will be noted that when relay 70 is operated, the reduced power supply to motors 17 and 18 is furnished through the right hand brushes of cam B.

At any time it is desired to play back the record, knob 60 is turned to position 6. Under this condition the circuit to motor 18 to maintain tension is partially opened at the upper right hand brush of cam B but the circuit through this brush is paralleled through the upper back contact and armature of relay 70. Operation of switch 62 will operate relay 70 as described above. This will cause full power to be delivered to motor 17 by a circuit from terminal 65, the lower armature and front contact of relay 70, cam C, the upper left and lower right hand brushes thereof, winding of motor 17 to terminal 66 via cam A. The tension circuit for motor 18 will be opened at the back contact of the upper armature of the relay. The clutch magnet 22 will receive an obvious operating circuit in position 6 via cam B, thereby disconnecting motor 19 from drum 13 to reduce the load on the filament. Under this condition the record will be rewound as far as desired, the indication of counter 26 being observable to facilitate this. When it is desired to stop this rewinding process, switch 62 may be released to release relay 70 which will restore power through the resistances of both motors 17 and 18 to provide filament tension.

Playback may be effected by turning knob 60 to position 4 which will connect photo-cell 40 to the input of the amplifier via cams H and I, and will connect transmitter-receiver 69 to the output of the amplifier via the upper right hand brushes of cams D and E. Operation of switch 62 will energize motor 19 as described for recording to advance the record and effect reproduction therefrom.

It may be that only a portion of the record is to be played back and it is desired again to record where the previous record was discontinued. Knob 60 may be moved to position 5, which will partially open the tension circuit for motor 17 at the lower right hand brush of cam B and will energize the clutch magnet by a previously described circuit through cam B. When switch 62 is operated, the resulting operation of relay 70 will furnish full driving current to motor 18 from power terminal 65 the lower armature and front contact of the relay, the upper brushes of cam C, the winding of motor 18 to power terminal 66 via cam A. The tension circuit for motor 17 will be opened at the lower back contact of relay 70. Under these conditions the record will be wound rapidly on spool 16. This winding operation may be discontinued by release of switch 62 when the counter has indicated a fresh portion of the filament is available. Knob 60 may then be moved to position 3 and the recording operation continued.

When the record is completed and it is desired to play it back in its entirety as, for example, when a stenographer is to type a dictated record, it may be rewound as described above and then played back, observation of the counter enabling the rewinding operation to be stopped before the filament is completely unwound from spool 16.

Means may be provided to lift the blade 31 from the filament for all operating positions of knob 60 except for recording position 3. This may be effected for such positions by connecting the recorder 30 to a direct current supply, shown conventionally as battery 71 although it may, of course, be a source of D. C. in the amplifier and power converter 63, which will be of such polarity and potential as to drive the blade 31 up clear of the filament. The circuit for this in positions 2, 4, 5 and 6 may be traced from the lower terminal of battery 71, the upper left hand and lower right hand brushes of cam F, the winding of recorder 30, the lower right hand and upper left hand brushes of cam G to the upper terminal of battery 71.

If a flat tape or ribbon is employed the record may be made on the edge thereof, in which case it will have an edge presented to the blade 31, as viewed in Figure 2, for recording. The record then will be similar to 32 of Figure 3 except, of course, the ribbon or film may be as wide as appropriate. It may be presented flat to the light beam for reproduction.

If a film is employed, the record may be made in the center of, or other appropriate path on, it by a cutting blade which may be formed as a chisel having a substantially V-shaped distorting or cutting edge similar to that disclosed in the Vermeulen et al. Patent No. 2,154,589 issued April 18, 1939, and the resulting record may be generally similar to that of Figure 2 of that patent, except that a homogeneous film of optically active material will be employed. The polarization of the light beam used in reproduction and the medium 38 of my Figure 1 may be such as to extinguish the beam with a blank film. The record which is cut in the film will result in the rotation of the light rays so that the record with its undulations will be visible to the photocell as it is passed through the light beam. The screen 39 may be omitted. The use of flat tapes or films will require appropriately shaped reels or the like for supply and take up as will be understood.

It is contemplated that in practicing this invention wide departure may be made within its scope with reference to the storage means for the filament, conventionally shown in the drawings as bobbins 2 and 16. Where a long record as, for example, for court proceedings or continuous recording of radio programs is required, each of the bobbins may be of sufficient size to contain the entire record. The supply filament, as an alternative, may be furnished wound in the form of a frustrum of large capacity in the same general way that yarn is conventionally supplied to the knitting and weaving industry, whereby the filament will be delivered from the top of the cone without tangling. In the employment of such an arrangement a second wheel similar to 13 may be provided on the input side of the recorder equipped with an appropriate drag, or other suitable means may be employed, to maintain the filament under suitable tension.

The takeup bobbin 16 may be so constructed that one end of it and the core may be removed after recording so that the filament may be supplied for playback from the inside, thereby obviating the necessity of rewinding prior thereto. In order to facilitate delivery of the filament with such an arrangement, bobbin 16 may be conically shaped. The bobbins may, of course, be made of an inexpensive material, such as cardboard.

I may provide an arrangement for facilitating the location of a particular portion of the record by cooperating a modified counter such as 26 with manually adjustable dials. The patent of Messiter No. 1,307,369, dated June 24, 1919, shows such an arrangement. The counter dials may be provided with electrical contacts and the manually adjustable dials may be similarly equipped in accordance with the teachings of this patent. A relay may be substituted for the bell 104 thereof, said relay in operating stopping the winding operation by, for example, causing the release of relay 70 when the desired count is reached. By this arrangement the manually adjustable dials may be set for the count of the desired portion of the record and the winding operation started. When this count is reached the filament will be stopped.

The arrangement shown by Figure 1 is for both recording and reproducing. These two functions may be provided, of course, by separate machines by provision in each only those elements necessary for its particular operations.

Three motors are shown in Figure 1 to provide the several operations of the device. This has been done as an expedient in setting out this invention. It is contemplated that a single motor, or two motors, may be used with appropriate controls, gearing and other necessary mechanical elements to provide the driving operations as will be understood.

While a filament, tape or the like is particularly well adapted to the purposes of this invention, it will be recognized that it can be adapted to employ a disc or cylinder record of optically active material which can be cut in accordance with the received signals. Reproduction with such an arrangement can be effected by passing a beam of polarized light through the record as it rotates and detecting the transmitted beam substantially as set out above.

It will be recognized that the arrangements set out may be employed in connection with talking moving pictures. The film with such an arrangement may be of an optically active material, with the sound record impressed in an appropriate otherwise unoccupied path thereon. Polarized light may be used for the pickup. Such an arrangement would be particularly attractive for amateur use where a positive is made from the originally exposed film. The sound record may be directly made on the sound path of the film by mechanical action in response to the received sound as the picture is taken.

I may employ in claiming this invention terms such as "optically active" or "having light rotative characteristic" with respect to the material employed for the record medium. These may be considered as expressions relating to observable phenomena of certain light transmitting substances including materials, particularly of the cellulose group, having predetermined oriented grained structure, to in effect rotate polarized light and thereby make visible, by their introduction into a polariscope, a beam of normally extinguished polarized light, or the converse. Terms such as "light rotative modulations" and others to this end may be considered as relating to the effect on a polarized scanning beam of a record such as described herein being passed through it. Furthermore, expressions in the claims relating to modulation of the scanning beam by the record may, as appropriate, be considered as directed to the portion of the beam affected by the record.

My invention is not limited to the particular apparatus and arrangement thereof, and circuits which are illustrated, but may be modified without departing from the spirit and scope of my invention as set forth in the appended claims.

What is claimed is:

1. The method of recording and reproducing signals employing a medium of optically active light transmitting material which consists in moving the medium at substantially uniform speed while modifying its light rotative characteristic in response to received signals, subsequently passing the medium through polarized light which the medium rotatively modulates in accordance with the record on it and translating the resulting modulated light into signals corresponding to those received.

2. A signal recorder and reproducer including an extensive medium of light transmitting optically active material, means to change the light rotative characteristic of the medium in response to received signals to make a record of the signals along the medium, means to produce a beam of polarized light, means to pass the medium through the beam to rotatively modulate it in accordance with the record and means responsive to the rotative modulation of the beam as the medium is passed through it to produce signals in accordance with the record on the medium.

3. A sound recorder and reproducer including, in combination, a filament of optically active material, means to modify the light rotative characteristic of the filament in response to received sound waves to form a record of said waves, means to produce a beam of polarized light, a polarizing medium intersecting the beam, means to drive the filament through the beam between the producing means and the medium to rotatively modulate the beam and means including the medium for detecting the modulations of the beam and converting them into sound waves.

4. A signal recorder and reproducer including, in combination, a filament of optically active material, means to modify the light rotative characteristic of the filament in response to received signals to form a record of said signals, means to produce a beam of substantially monochromatic polarized light, a polarizing medium intersecting the beam, means to drive the filament through the beam between the producing means and the medium to rotatively modulate the beam and means including the medium for detecting the modulations of the beam and converting them into signals.

5. A sound recorder and reproducer including, in combination, a filament of optically active material, a first spool to hold the filament, means to drive the filament, means to modify in response to sound waves the light rotative characteristic of the filament as it is being driven, a take-up spool, means to drive the takeup spool, means to maintain the filament under tension as it is being driven, means to rewind the filament from the takeup spool to the first spool, means to produce a beam of polarized light through which the filament bearing a record may be driven to modulate the beam in at least one detectable characteristic including the angle of polarization and means to convert the modulated beam into sound.

6. A sound recorder and reproducer including, in combination, a filament of optically active material, a first spool to hold the filament, means to drive the filament, means to modulate the filament, including its light rotative characteristic, in response to sound waves as it is being driven, a takeup spool, means to drive the takeup spool, means to maintain the filament under tension as it is being driven, means to rewind the filament bearing a record from the takeup spool to the first spool, means to produce a beam of substantially monochromatic polarized light through which the filament bearing a record may be driven to modulate the beam in at least one detectable characteristic including the angle of polarization and means to convert the modulated beam into sound.

7. The method of reproducing signals from a medium of light transmitting optically active material bearing a signal record of light rotative modulations which consists in passing the record through a beam of polarized light to rotatively modulate the beam in accordance with the record, converting the rotatively modulated beam into an intensity modulated beam and converting the intensity modulated beam into signals.

8. A signal reproducing device including a long medium of optically active light transmitting material the light rotative characteristic of which has been modified to form a signal record, means to produce a beam of substantially monochromatic polarized light, means to pass the medium through the beam to rotate the beam in accordance with the record and means to convert the light beam thus rotated into signals.

9. A device to produce signals from a substantially round flexible filament bearing undulations on not more than two quadrants to form a signal record including, in combination, means to drive the filament longitudinally and detecting means cooperating with the filament as it is being driven to produce signals in response to the undulations thereon for any angle about its axis the filament may be presented to the detecting means.

10. A device to reproduce sound from a record of optically active light transmitting material the light rotative characteristic of which has been modulated in accordance with sound waves including means to produce a beam of polarized light, means to drive the record through the beam to rotatively modulate it in accordance with the record and means responsive to the modulated beam to produce sound waves corresponding to the record.

11. A device to produce signals from a medium of optically active light transmitting material, the light rotative characteristic of which has been modulated to form a signal record including, in combination, means to produce a beam of polarized light, means to drive the medium through the beam to rotatively modulate the beam in accordance with the record, an analyzer including a photo-responsive element to receive the modulated beam and means including the photo-responsive element to produce signals corresponding to the record in response to the modulated beam.

12. A device to produce signals from a medium of optically active light transmitting material the light rotative characteristic of which has been modified to form a signal record including, in combination, means to produce a beam of particularly polarized light, a polarizing element intersecting the beam and so oriented with respect to it as to normally substantially extinguish the beam, means to drive the medium through the beam above said element at such angle with respect to the polarization thereof that the portion of the beam corresponding substantially to the section of the medium therein will be rotated in accordance with the record to cause it to be transmitted beyond said element and means beyond said element to convert the beam into signals corresponding to the record.

13. A device to produce signals from a medium of optically active light transmitting material the light rotative characteristic of which has been modified to form a signal record including, in combination, means to produce a beam of substantially monochromatic polarized light, light polarizing means intersecting the beam and so oriented with respect to it as to normally substantially extinguish the beam, means to drive the medium through the beam above the polarizing means at such angle with respect to the polarization thereof that the portion of the beam corresponding substantially to the section of the medium therein will be rotated in accordance with the record to cause it to be transmitted beyond the polarizing means and means beyond said polarizing means to convert the beam into signals corresponding to the record.

14. A reproducer of sound from a filament of optically active light transmitting material bearing light rotative modulations to form a sound record including, in combination, means to produce a beam of polarized light, means including a motor to drive the record through the beam to cause the beam to be rotatively modulated in accordance with the record, means to convert the rotatively modulated beam into an intensity modulated beam and means to convert the intensity modulated beam into sound corresponding to the record.

15. A signal recorder and reproducer including, in combination, a filament of material having optically active property, a supply spool of said filament, a takeup spool for said filament, means to drive the filament from the supply spool to the takeup spool, means to modify the light rotative characteristic of the filament in response to received signals to make a record of the signals on the filament as the latter is being driven from the supply spool to the takeup spool, means to rewind the filament from the takeup spool to the supply spool, means including a beam of polarized light passed through the filament bearing a record for reproducing signals from the filament corresponding to those recorded as the filament is driven from the supply spool to the takeup spool and means to control selectively the operations of recording, rewinding and reproducing.

16. A signal recorder and reproducer including, in combination, a filament of optically active material, means to drive the filament, a signal input circuit, an amplifier, a recorder element responsive to received signals to modify the light rotative characteristic of the filament as it is being driven to record said signals on said filament, means to produce a beam of polarized light through which the filament bearing a record is driven to rotatively modulate the beam in accordance with the record on the filament, reproducing means to convert said rotatively modulated beam into signals corresponding to those recorded, a signal output circuit and means to connect the amplifier between the signal input circuit and the recorder element during the recording operation, and between the reproducing means and the signal output circuit during the reproducing operation.

17. A signal recorder and reproducer including a filament of optically active material, a supply spool, a takeup spool, means selectively operable to drive the filament from the supply spool to the takeup spool or to rewind the filament from the takeup spool to the supply spool, a blade member adapted to engage the filament and place thereon light rotative modulations in response to received signals as the filament is being driven from the supply spool to the takeup spool, means including a beam of polarized light through which the filament bearing a record is driven from the supply spool to the takeup spool for reproducing signals from the record on the filament and means for maintaining the blade member out of engagement with the filament except when a record is being made.

18. A device to produce signals from a filament of light transmitting material having an oriented grained structure and bearing a signal record consisting of undulations including, in combination, means to drive the filament, means to scan the filament with polarized light with at least a portion of the rays of said light including an angle of substantially 90°, said filament being effective to modulate said light in accordance with the recorded signals, and means to convert the modulated light into signals.

19. A reproducer of signals from a normally substantially round extensive flexible medium of light transmitting material having an oriented grained structure and capable of refracting light and which bears an undulatory signal record including means to produce a thin beam of polarized light, means to pass the medium in a predetermined direction through the beam at substantially uniform speed, the medium being presented to the beam at chanced orientations around the longitudinal axis of the medium, the record being effective to impart to rays of the beam refractive modulations and rotative modulations, and means to convert the two types of modulated rays into signals, the effect on last said means of each type of modulation at any instant bearing a substantially inverse relation to each other dependent on the angular orientation of the filament to the beam whereby the amplitude of said signals is substantially independent of the angular orientation of the medium to the beam.

20. A signal recorder including a flexible light transmitting medium, means to drive the medium and means selectively operable to place modulations on said medium in response to signals from a certain source to make a record of said signals as the medium is being driven or to place modulations on said medium other than in response to signals from said source, either of said modulations being of such character as to be detectible by a scanning beam of polarized light.

21. A signal recorder including a medium of birefringent material, means to drive the medium, means to modify the birefringency of the medium in response to signals as the medium is being driven and a second means to modify the birefringency of the medium as it is being driven.

22. A device to produce signals from a substantially round filament of light transmitting material of homogeneous cross section bearing a signal record on not more than two quadrants which is capable of modulating rays of light passed through the record as the filament is being driven including, means to drive the filament in random orientations of it around its longitudinal axis, means to pass through said filament, as it is being driven, thin converging scanning light which intersects the filament at substantially the convergent point of said light, with the angle of convergence of said light sufficiently wide so that at least some of the rays of the light are modulated by the record for any of said orientations of the filament at the point where it is intersected by said light, and means to translate said modulated rays into signals.

JUDSON O'D. SHEPHERD.

REFERENCES CITED

The following references are of record in the file of this patent:

UNITED STATES PATENTS

| Number | Name | Date |
|---|---|---|
| 789,336 | Poulsen | May 9, 1905 |
| 1,335,595 | Moore | Mar. 30, 1920 |
| 1,350,246 | Steiger | Aug. 17, 1920 |
| 1,681,376 | Snook | Aug. 21, 1928 |
| 1,802,747 | Zworykin | Apr. 28, 1931 |
| 1,917,003 | William | July 4, 1933 |
| 1,918,848 | Land | July 18, 1933 |
| 1,946,596 | Symonds | Feb. 13, 1934 |
| 2,086,130 | Hickman | July 6, 1937 |
| 2,188,687 | Lohn | Jan. 30, 1940 |
| 2,213,250 | Kotte | Sept. 3, 1940 |
| 2,215,468 | Herzig | Sept. 24, 1940 |
| 2,220,488 | Lott | Nov. 5, 1940 |
| 2,256,093 | Land | Sept. 16, 1941 |
| 2,263,316 | Ryan | Nov. 18, 1941 |

FOREIGN PATENTS

| Number | Country | Date |
|---|---|---|
| 633,624 | France | Oct. 25, 1927 |
| 276,708 | Great Britain | Sept. 1, 1927 |
| 384,258 | Great Britain | Dec. 22, 1932 |